(12) United States Patent
Wasserman et al.

(10) Patent No.: US 8,706,134 B2
(45) Date of Patent: Apr. 22, 2014

(54) METHOD AND SYSTEM OF PROVIDING NAVIGATION SERVICE WITH DIRECTORY ASSISTANCE

(75) Inventors: David M. Wasserman, Livingston, NJ (US); Stephen L. Greene, Bedminster, NJ (US); Robert T. Winslow, Aliso Viejo, CA (US); Thaveesak Kraisornsuthasinee, New York, NY (US); Marianne Killelea, Middleton, MA (US); Richard A. Cucksey, Bellingham, WA (US); Sundar Rajan Padmanabhan, Irving, TX (US); Suzi Levas, New City, NY (US); Joseph Gu, Forest Hills, NY (US); Srinivas R. Karra, Harsdale, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1215 days.

(21) Appl. No.: 11/872,393

(22) Filed: Oct. 15, 2007

(65) Prior Publication Data

US 2009/0098860 A1    Apr. 16, 2009

(51) Int. Cl.
*H04M 3/42* (2006.01)
*H04W 24/00* (2009.01)

(52) U.S. Cl.
USPC .............. 455/456.1; 340/988; 340/995.1; 340/995.19; 455/414.1; 455/456.2; 455/456.3; 455/456.4; 455/456.6; 701/400; 701/408

(58) Field of Classification Search
USPC .......... 455/414.1, 456.1, 456.2, 456.3, 456.4, 455/456.5, 456.6; 340/988, 995.1, 995.19; 701/400, 408
See application file for complete search history.

(56) References Cited

U.S. PATENT DOCUMENTS

| | | | | |
|---|---|---|---|---|
| 5,528,501 A | * | 6/1996 | Hanson | 701/200 |
| 6,002,936 A | * | 12/1999 | Roel-Ng et al. | 455/456.4 |
| 7,076,046 B2 | * | 7/2006 | Pines et al. | 379/218.01 |
| 2002/0004382 A1 | * | 1/2002 | Cox et al. | 455/414 |
| 2003/0152200 A1 | * | 8/2003 | Bruce et al. | 379/88.18 |
| 2005/0100153 A1 | * | 5/2005 | Pines et al. | 379/218.01 |
| 2006/0069503 A1 | * | 3/2006 | Suomela et al. | 701/211 |
| 2006/0084414 A1 | * | 4/2006 | Alberth et al. | 455/414.1 |
| 2006/0136122 A1 | * | 6/2006 | Fraser et al. | 701/202 |
| 2007/0067807 A1 | * | 3/2007 | O'Neil | 725/62 |

* cited by examiner

*Primary Examiner* — Vladimir Magloire
*Assistant Examiner* — Edd Rianne Plata (57) ABSTRACT

An approach is disclosed for providing navigation information for a requested listing to a mobile device caller of a directory assistance call. If the caller selects an option to receive driving directions to the listing destination, the directory assistance provider forwards the listing address to a platform that correlates the address with location coordinates. The platform can poll the calling device to obtain GPS identifying data for the mobile device and derive mapping and routing information.

18 Claims, 6 Drawing Sheets

METHOD AND SYSTEM OF PROVIDING NAVIGATION SERVICE WITH DIRECTORY ASSISTANCE

BACKGROUND INFORMATION

Wireless communication technologies continue to develop an expanding set of capabilities. With increased sophistication of wireless communication devices, enhanced services, such as navigational functionality, have become available.

In support of navigational services, cellular phones are equipped with Global Positioning System (GPS) technology to enable broadcast of their locations. Mobile devices are provided with display capabilities that are interactive with mapping applications. The display provides a graphical representation of the current location of the user in relation to a map of the geographical area. Mapping applications can derive travel directions between the current location of the user and a specific geographical destination, on a real time basis. Derivation of travel directions can be implemented dynamically by a remote service provider that has access to the destination location and the current GPS location of the mobile device. The service provider transmits the travel directions to the mobile device. Alternatively, an application resident in the mobile device can derive travel directions if provided with the destination location data and the location data of the mobile device.

In order for a user to obtain directions from a wireless phone, the destination address must be entered. Entry of this amount of information can be difficult and dangerous to do while driving a vehicle or while walking. The degree of difficulty is increased if the user does not know the address of the destination with the particularity necessary for execution by the mapping application.

Therefore, there is a need for an approach that provides improved navigation services for wireless applications.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

Apparatus and method for providing navigation and location service are described. In the following description, for the purposes of explanation, numerous specific details are set forth in order to provide a thorough understanding of the various exemplary embodiments. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Although the various embodiments are described with respect to Global Positioning System (GPS) technology, it is contemplated that these embodiments have applicability to other equivalent navigational and location determination technologies.

Figure 1:
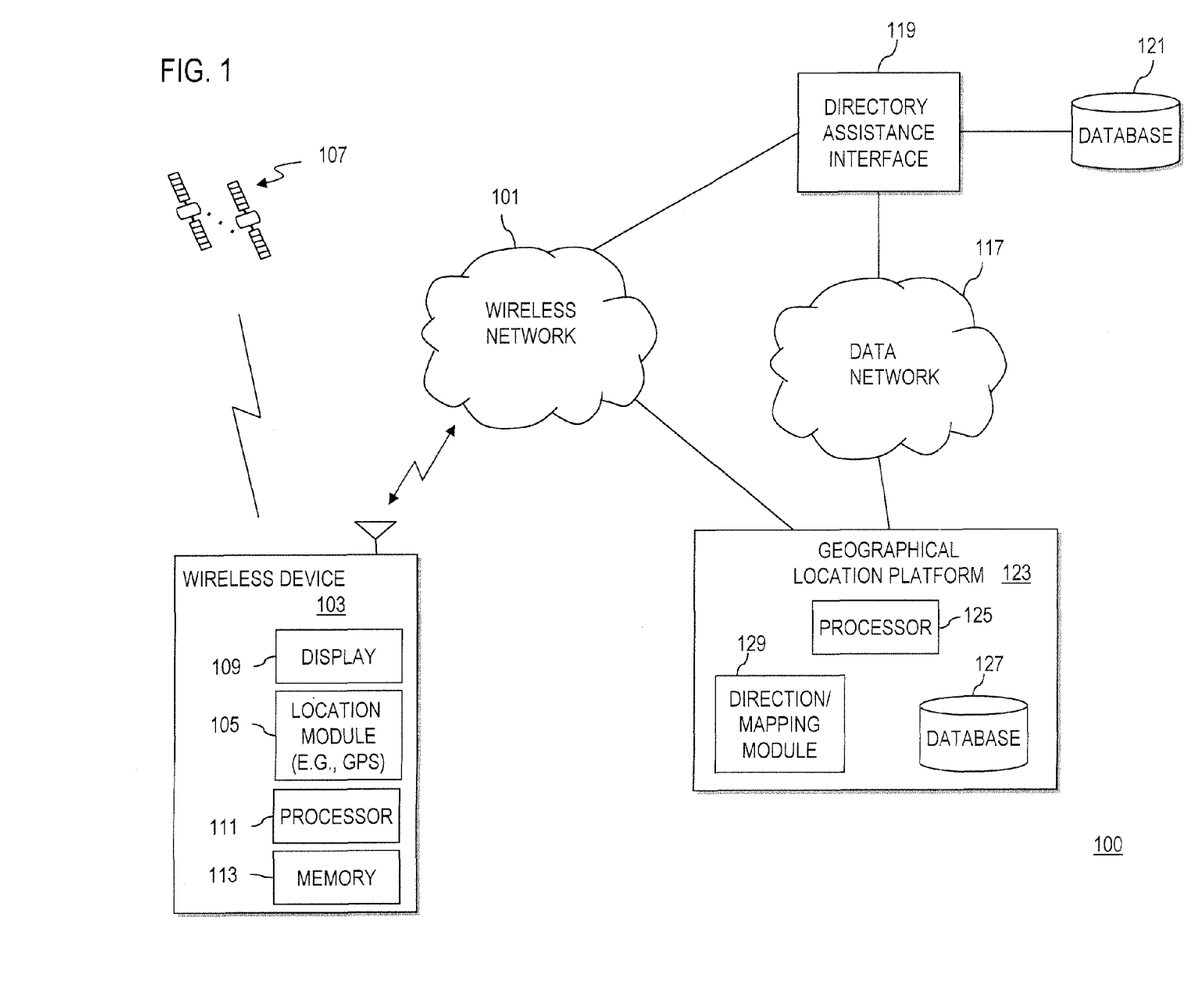
FIG. 1 is a diagram of a communication system capable of providing navigation and location service, in accordance with an exemplary embodiment.

FIG. 1 is a diagram of a communication system capable of providing navigation and location service in accordance with an exemplary embodiment. It is to be understood that the illustrated service provider networks encompass a vast number of system elements that are well known. For simplicity and efficiency of explanation, only those elements that facilitate understanding of the described underlying concepts are illustrated.

The communication system 100 includes a wireless (e.g., cellular) network 101 capable, for example, of handling CDMA or GSM transmission with a wireless device 103. In this exemplary embodiment, a location module 105 within the wireless device 103 can obtain location information using Global Positioning System (GPS) technology, and thus, behave as a GPS receiver.

Location module 105 communicates with a constellation of satellites 107. As well known, satellites 107 transmit very low power interference and jamming resistant signals. At any point on Earth, the GPS receiver in module 105 can receive signals from multiple satellites. Location module 105 may determine three-dimensional geolocation from signals obtained from at least four satellites. Measurements from satellite tracking and monitoring stations located around the world are incorporated into orbital models for each satellite to compute precise orbital or clock data. GPS signals may be transmitted over two spread spectrum microwave carrier signals that are shared by GPS satellites 107. Location module 105 can identify the received GPS, decode the ephemeris and clock data, determine the pseudo range for each satellite 107, and compute the position of the receiving antenna.

Display 109 in the wireless device 103 can present a graphic of a map and directions, so as to permit viewing of the current location of the wireless device within the map of a pre-defined size (e.g., a street block wide, a mile wide, etc.). The wireless device 103 also contains a processor 111 and a memory 113, which are configured to store and execute instructions for supporting navigation service, as well as other communication functions. Although the wireless device is depicted as a cellular phone in the illustrated example, the teachings herein are also applicable to other wireless devices such as laptop computers, pagers, personal communication systems (PCS), personal digital assistants (PDA), and the like, which are capable of ubiquitous communication at any given time or place.

Wireless network 101 is coupled to data network 117. Data network 117 may comprise, for example, a public network, such as the Internet, or a private data network such as commonly employed with the public switched telephone network (PSTN). A directory assistance interface 119 is coupled via appropriate gateways to the wireless network 101 and the data network 117. As well known, the directory assistance interface may comprise a traffic operator position switch (TOPS) to permit voice interaction between a caller and a directory assistance operator. The operator may be a live person or an automated attendant. A database 121 is coupled to the directory assistance interface 119. The database 121 contains telephone numbers and addresses for listed subscribers.

Geographical location platform 123, also coupled to data network 117, comprises processor 125, database 127, and direction/mapping module 129. While platform 123 has been represented by a block in FIG. 1, database 127 need not be in the physical vicinity of processor 125. Database 127 correlates listed addresses with their respective geographical location coordinates. The direction/mapping module 129, in conjunction with processor 125, can provide map data and travel direction data between a calling mobile device 103 and a listed location. Reference is made to U.S. Pat. No. 7,260,474, issued Aug. 21, 2007, as an example of a known implementation for deriving route directions that can be correlated with a map representation, and is incorporated herein by reference in its entirety. Geographical location platform 123 has the capability to transmit such map and travel data to wireless devices that do not contain route navigation applications. Geographical location platform 123, alternatively, can transmit destination location coordinates to the wireless device 103, which contains a navigation application in location module 105 for deriving directions.

The wireless network may include the capability to offer text messaging service, commonly known as Instant Messaging (IM) or Short Message Service (SMS). Instant messaging is a form of real-time communication between two or more users based on typed text, wherein the text is conveyed via computers connected over the data network 117. As the name suggests, SMS service enables the transmission of short text messages among wireless devices 103 in a store and forward manner. These short text messages in general can be delivered at any point in time using out-of-band packet, low-bandwidth delivery mechanisms.

Figure 2:
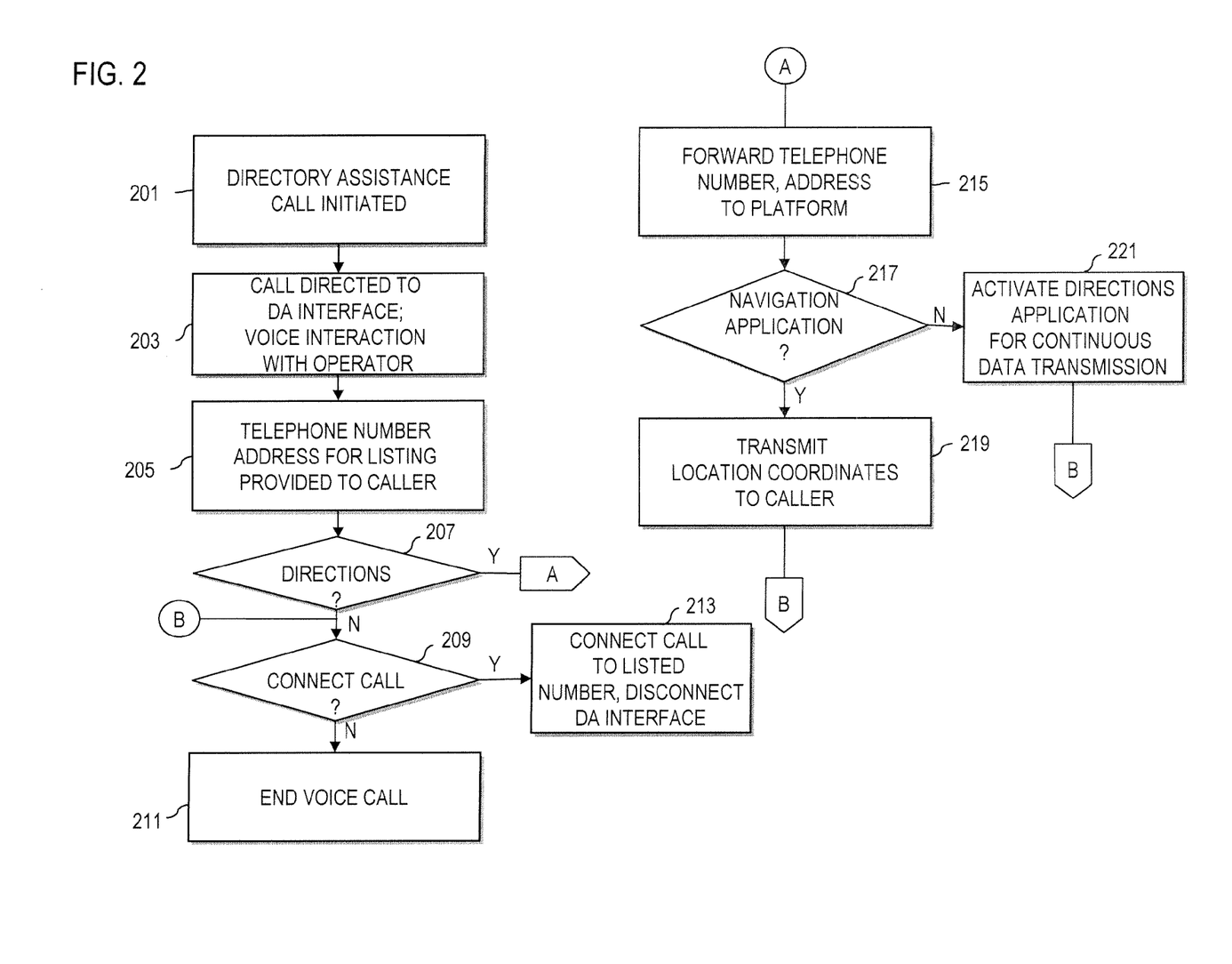
FIG. 2 is a flowchart of an exemplary call process in operation of the system of FIG. 1.

FIG. 2 is a flowchart of an exemplary call process in operation of the system of FIG. 1. In this process, navigation information can be generated for a directory assistance listing requested by a calling mobile device. At step 201, a directory assistance call is initiated by mobile device 103. The call is directed to the directory assistance interface 119 at step 203. The caller and operator engage in voice interaction to identify the desired listing. For example, the caller may be asked to state the city and state, as well as a name, for the listing. The caller will be asked if route directions to the address for the listing are desired. Options for receiving a text message of the telephone number and address and/or for connection of the call to the listed telephone number may also be presented to the caller.

At step 205, the telephone number and address for the listing is provided to the caller by voice communication. At step 207, determination is made as to whether route directions are desired by the caller. If not, determination is made at step 209 whether the call is to be connected to the requested listing. If not, the voice call is ended at step 211. If a connection determination is made at step 209, the call is connected to the listing at step 213 and directory assistance interface is disconnected.

If the caller has requested route directions, as determined at step 207, the telephone number and address for the listing is forwarded to the geographical location platform at step 215. At step 217, a determination is made as to the navigational capability of the calling mobile device. In the illustrated example, the wireless device contains a navigational application in location module 105 that can derive route directions to a specific end location in reliance upon its current location as obtained from GPS signals received from satellites 107.

If determination is made at step 217 that the caller device contains navigation routing capability, as exemplified by wireless device 103, the platform 123 need only provide the geographical location coordinates. At step 219, database 127 is accessed to provide the location coordinates that correspond to the listed address. Data for these coordinates are transmitted to caller and the navigation application in location module 105 is activated. The process flow then reverts to step 209.

Figure 5:
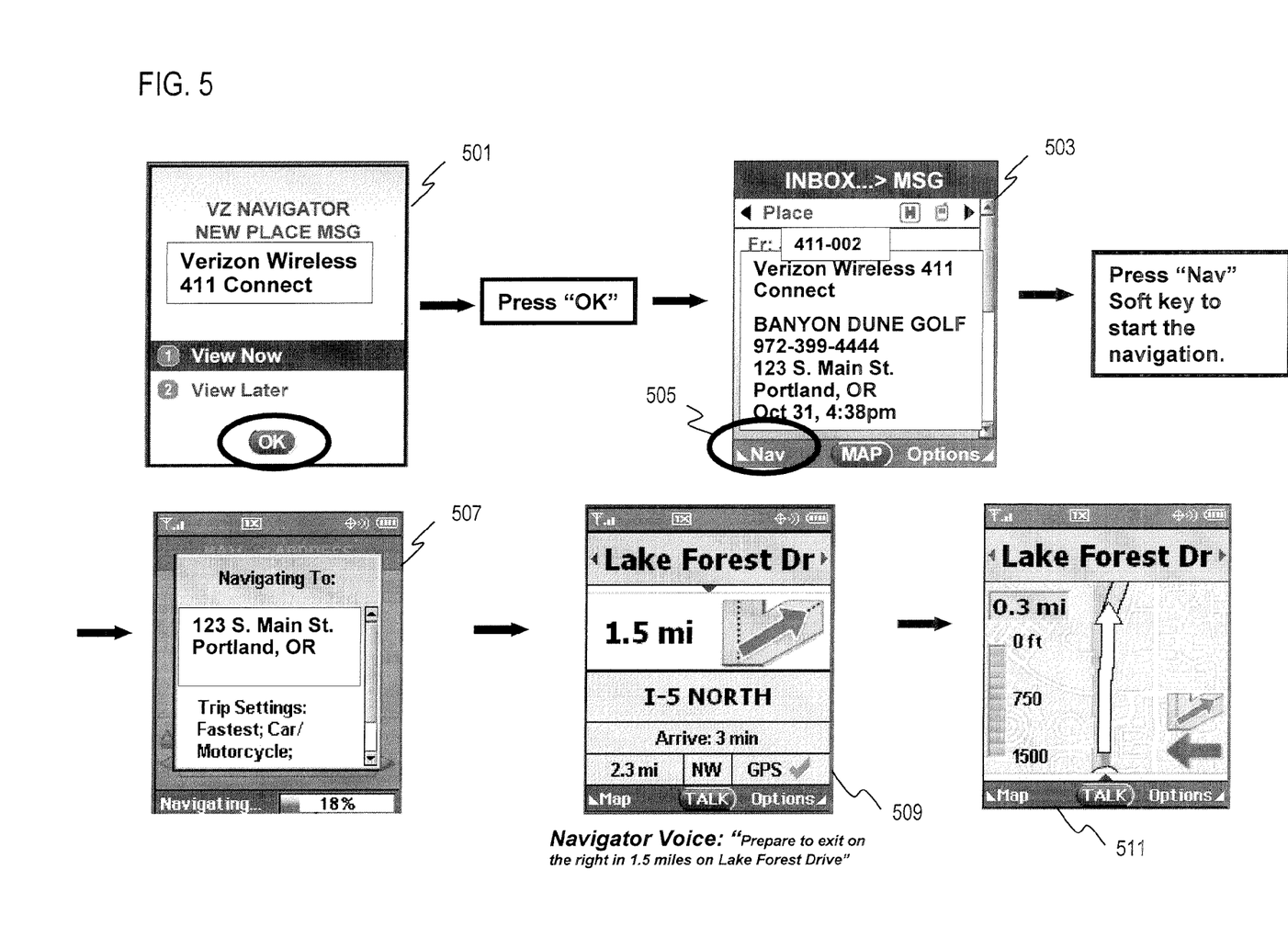
FIG. 5 is a diagram of a user interface for accessing the navigation and location service, according to an exemplary embodiment.

If determination is made at step 217 that the caller device cannot, in itself, derive route directions to a specific end location, the direction/mapping module 129 is activated at step 201. Route directions to the end location coordinates obtained from database 127 are derived. The platform 123 polls the calling mobile device 103 to determine current position of the device 103. Upon receipt of the route directions, an application is activated in the mobile device 103 that presents navigation instructions to the user. The process flow reverts to step 209 for completion of the voice call. Data communication between the platform 123 and the mobile device 103 occurs until the caller terminates the direction route application, and thus may continue after the voice call has terminated. GPS data, representing the instantaneous location of the mobile device 103 are transmitted to the platform 123 and route direction data are transmitted to the mobile device 103 from platform 123. An exemplary user interface for the mobile device 103 is shown in FIG. 5.

The described system and process provides a hands-free technique for obtaining navigation walking or driving directions for a user of a handset. By allowing a directory assistance service provider to send requested turn-by-turn instructions, the need for a succession of entries of a keypad in a handset is obviated. Such keypad entries can be difficult and dangerous while driving a vehicle, or even when walking.

Figure 3:
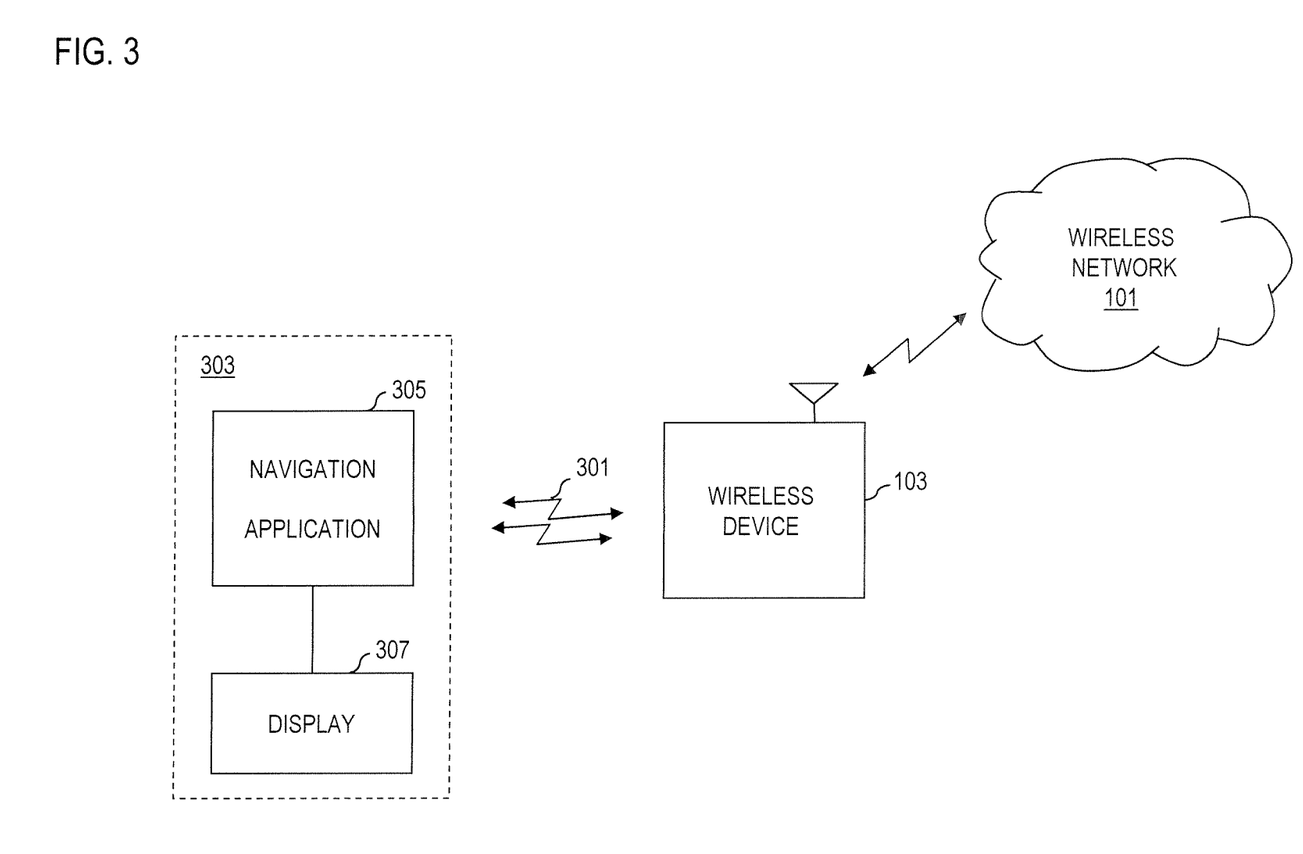
FIG. 3 is a partial diagram of a communication system such as shown in FIG. 1 in accordance with another embodiment.

FIG. 3 represents a variation of the system shown in FIG. 1. The illustrated elements of FIG. 1 that are identically embodied in the system variation of FIG. 3 are not shown for simplicity of explanation. Navigation application 305 is coupled to display 109 in a navigation unit 303 that is physically separate from wireless device 103. For example, the navigation unit 303 may be a well-known navigation system incorporated in a motor vehicle. Short range communication 301, so-called "Wi-Fi" or "BLUETOOTH" communication, between navigation unit 303 and wireless device 103 is supported in a well-known manner. The process described in FIG. 2 is applicable to the embodiment shown in FIG. 3. Following transmission by the geographical location platform 123 of the destination location coordinates to the wireless device 103 at step 218, the destination coordinates are transmitted from the wireless device 103 to the separate navigation unit 303, which is then activated. The navigation unit 303 has the inherent capability to receive GPS signals for identifying the current position of the vehicle. Map and driving direction data are then formulated by the navigation unit 303 for display, using the GPS data and the destination coordinate data.

Figure 4:
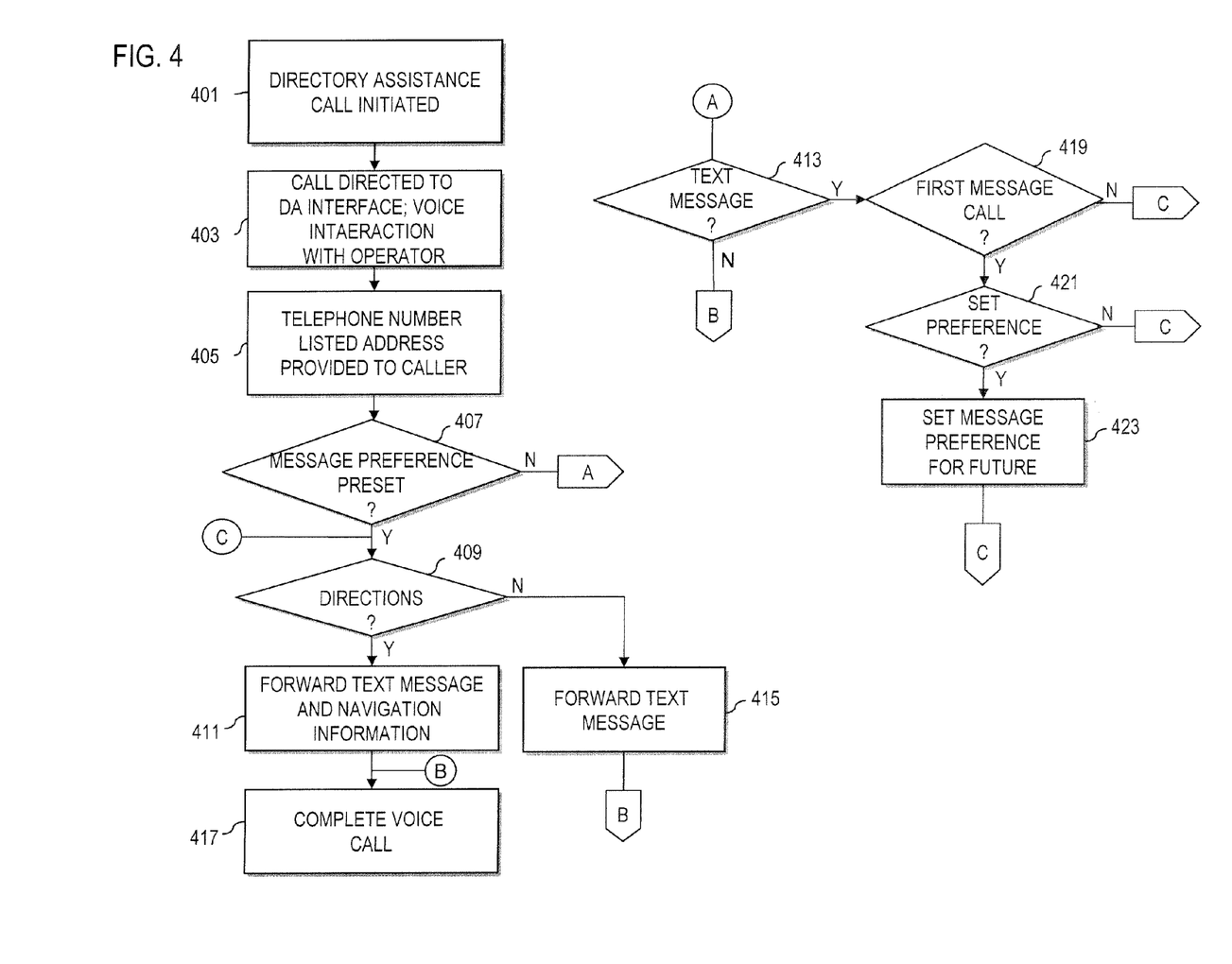
FIG. 4 is a flowchart of another exemplary call process in operation of the system of FIG. 1.

FIG. 4 is a flow chart of a call process that additionally provides for text messaging transmission. Text messages may be transmitted to wireless device 103 via the data network 117 from directory assistance interface 119 and geographical location platform 123. Directory assistance text messaging service may be offered to a phone user as a preference option for all directory assistance calls.

At step 401, a directory assistance call is initiated by mobile device 103. The call is directed to the directory assistance interface 119 at step 403. The caller and operator engage in voice interaction to identify the desired listing. For example, the caller may be asked to state the city and state, as well as a name, for the listing. The caller will be asked if route directions to the address for the listing are desired. Options for receiving a text message of the telephone number and address and/or for connection of the call to the listed telephone number may also be presented to the caller.

At step 405, the telephone number and address for the listing is provided to the caller by voice communication. The caller may be given options by the operator to receive a text message for the listing and to receive travel directions to the listed destination. At step 407, determination is made as to whether there is preference that has been set in the system for the calling subscriber device to receive text messages for listings. A set preference, or lack thereof, is indicated in the service provider's database. If a preset text message preference has been determined at step 407, determination is made whether the caller, during the present call, has selected the option to receive travel directions to the listed destination at step 409. The term "travel directions" in this context may include the turn-by-turn directions developed by the geographical location platform 123, as described above, or the geographical location coordinates for a user's device that has the capability to derive directions.

If the travel direction option has been selected as determined at step 409, the phone number and address for the listing are forwarded as a text message to the caller and travel directions are transmitted at step 411. The voice call is then completed at step 415. Call completion may include ending the call or connecting the call to the listed party while ending the directory assistance interface connection. If the travel direction option has not been selected as determined at step 409, only the text message is forwarded at step 415 and the call is then completed.

If it is determined at step 407 that a messaging preference has not been preset for the subscribing device of the caller, determination is made at step 413 whether the caller, during the present call, has selected the option to receive a text message of the listing. If not, the call is completed (step 417). If the text message option has been selected during the present call, determination is made at step 419 as to whether this is the first time that a caller from the calling subscriber device has selected the text message option in a directory assistance call. If not, the process reverts to step 409. If the calling subscriber device has been determined to have engaged in a previous text message call, as determined at step 419, determination is made at step 421 whether the caller has selected to receive text messages in future calls. If so, a message preference is set in the system for the subscriber device at step 423. The process then reverts to step 409. If the caller has not selected to receive text messages in future calls, as determined at step 421, the process reverts to step 409.

FIG. 5 is a diagram of a user interface for accessing the navigation and location service, according to an exemplary embodiment. By way of example, the wireless device 103 presents a series of graphical screens to the user, beginning with screen 501 which permits the user to initiate a directory assistance call. A results screen 503 is presented after the user provides the necessary input for the operator to send the requested information. In this example, the user has requested the number to a golf course; as such, the screen 503 shows a telephone number as well as address of the particular golf course. At this point, the user may depress a soft key 505 to launch the navigation application with the resultant address.

Screen 507 provides an acknowledgement of the user's request to obtain directions. A navigating bar is displayed to indicate that the application is loading the navigation routes, and in this instance, is 18% complete. Thereafter, a navigation screen 509 shows directions, along with an associated voice prompt. A map is also provided, as in screen 511.

The above described processes relating to providing navigation service with directory assistance may be implemented via software, hardware (e.g., general processor, DSP chip, an application specific integrated circuit (ASIC), field programmable gate arrays (FPGAs), etc.), firmware, or a combination thereof. Such exemplary hardware for performing the described functions is detailed below.

Figure 6:
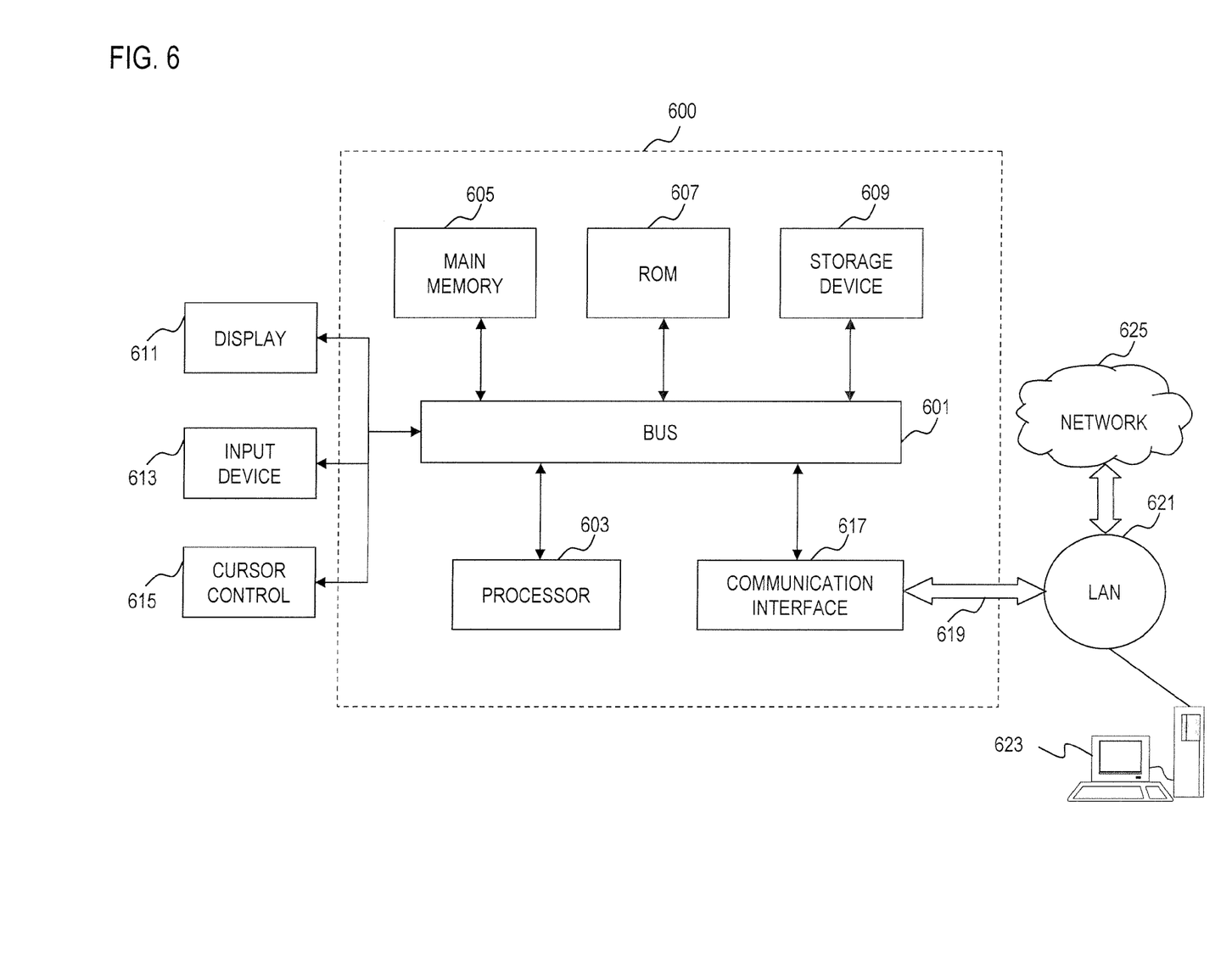
FIG. 6 is a diagram of a computer system that can be used to implement various exemplary embodiments.

FIG. 6 illustrates a computer system 800 upon which an exemplary embodiment can be implemented. For example, the processes described herein with respect to the geographical location platform 123 and the directory assistance interface can be implemented using the computer system 600. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to an embodiment, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the exemplary embodiment. Thus, exemplary embodiments are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an exemplary embodiment through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the various exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

What is claimed is:

1. A method comprising:
   receiving, at a directory assistance platform, a directory assistance request regarding a requested listing from a mobile device of a user;
   selectively determining, by the directory assistance platform, that the mobile device includes a navigation capability, wherein the navigation capability includes a routing capability; and
   in response to the determination, transmitting location information for the requested listing to the mobile device for the mobile device to generate navigation information for the requested listing,
   wherein, in the determining step it is determined that the mobile device does not include the navigation capability, the method further comprising:
   in response to the determination, generating navigation information for the requested listing; and
   transmitting the generated navigation information to the mobile device,
   wherein the step of generating comprises forwarding an address for the requested listing to a navigation application platform, and
   wherein the navigation information is forwarded to a navigation application resident in a device separate from the mobile device, the user receiving navigation instructions from the separate device.

2. A method as recited in claim 1, wherein the step of generating further comprises identifying location coordinates for the requested listing and forwarding the location coordinates to the navigation application platform.

3. A method as recited in 1, further comprising:
   activating the navigation capability in the mobile device to present navigation instructions to the user.

4. A method as recited in claim 3, further comprising transmitting a text message including an address for the requested listing to the mobile device.

5. A method as recited in claim 3, further comprising:
   identifying, by the directory assistance platform, the requested listing via voice interaction with a caller, wherein the navigation instructions include navigation walking or driving directions, and the directory assistance request is a directory assistance call.

6. A method as recited in claim 1, wherein the step of generating further comprises formulating directions to the address for the requested listing.

7. A method as recited in claim 1, wherein the generated navigation information comprises navigation instructions for graphic display in the mobile device.

8. A method as recited in claim 1, further comprising transmitting a text message related to the requested listing to the mobile device.

9. A method as recited in claim 8, wherein the text message comprises a telephone number and address for the requested listing.

10. A method as recited in claim 1, further comprising:
    determining whether a text message preference has previously been established for the mobile device; and
    if a text message preference has previously been established, transmitting to the mobile device a text message including one or more of a telephone number and address for the requested listing.

11. An apparatus comprising:
    a communication interface configured to receive a directory assistance request regarding a requested listing from a mobile device of a user; and
    a processor coupled to the communication interface, the processor configured to selectively determine that the mobile device includes a navigation capability, and in response to the determination, to cause the apparatus to transmit location information for the requested listing to the mobile device for the mobile device to generate navigation information for the requested listing, wherein the navigation capability includes a routing capability,
    wherein, the processor determines that the mobile device does not include the navigation capability, and the processor is further configured to, in response to the determination, generate navigation information for the requested listing, and to cause the apparatus to transmit the generated navigation information to the mobile device,
    wherein the generating of the navigation information comprises transmitting an address for the requested listing to a navigation application platform, and
    wherein the navigation information is forwarded to a navigation application resident in a device separate from the mobile device, the user receiving navigation instructions from the separate device.

12. An apparatus as recited in claim 11, wherein the generating of the navigation information comprises identification of location coordinates for the requested listing.

13. An apparatus as recited in claim 11, wherein the navigation capability is activated in the mobile device to present navigation instructions to the user.

14. An apparatus as recited in claim 13, wherein a text message including an address for the requested listing is transmitted to the mobile device.

15. An apparatus as recited in claim 11, wherein the generating of the navigation information further comprises determining directions to the address for the requested listing.

16. An apparatus as recited in claim 11, wherein the navigation information comprises navigation instructions for graphic display in the mobile device.

17. An apparatus as recited in claim 11, wherein a text message related to the requested listing is transmitted to the mobile device.

18. An apparatus as recited in claim 11, wherein the text message comprises a telephone number and address for the requested listing.

* * * * *